United States Patent
Lambert et al.

(10) Patent No.: US 10,205,785 B2
(45) Date of Patent: Feb. 12, 2019

(54) SYSTEMS AND METHODS FOR PROVIDING VIRTUAL CRASH CART ACCESS TO AN INFORMATION HANDLING SYSTEM

(71) Applicant: Dell Products L.P., Round Rock, TX (US)

(72) Inventors: Timothy M. Lambert, Austin, TX (US); Shawn Joel Dube, Austin, TX (US); Pablo Rafael Arias, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 14/483,694

(22) Filed: Sep. 11, 2014

(65) Prior Publication Data

US 2016/0080468 A1 Mar. 17, 2016

(51) Int. Cl.
| | |
|---|---|
| *H04L 29/08* | (2006.01) |
| *G06F 13/10* | (2006.01) |
| *H04L 29/06* | (2006.01) |
| *G06F 9/50* | (2006.01) |

(52) U.S. Cl.
CPC .......... *H04L 67/125* (2013.01); *G06F 13/105* (2013.01); *H04L 63/10* (2013.01); *H04L 67/04* (2013.01); *H04L 67/08* (2013.01); *H04L 67/36* (2013.01); *G06F 9/50* (2013.01)

(58) Field of Classification Search
CPC ......... G06F 13/105; G06F 9/50; H04L 67/04; H04L 67/125; H04L 63/10; H04L 67/08; H04L 67/36
See application file for complete search history.

(56) References Cited

U.S. PATENT DOCUMENTS

| | | | | |
|---|---|---|---|---|
| 2003/0115038 A1* | 6/2003 | Want | ........................ | H04L 67/08 703/24 |
| 2005/0213560 A1* | 9/2005 | Duvvury | ........... | H04L 29/12292 370/351 |
| 2006/0031447 A1* | 2/2006 | Holt | ........................ | H04L 12/24 709/223 |
| 2006/0190238 A1* | 8/2006 | Autor | .................... | G06F 13/105 703/25 |
| 2013/0007224 A1* | 1/2013 | Yang | ........................ | H04L 67/08 709/219 |

(Continued)

*Primary Examiner* — Gil H. Lee
(74) *Attorney, Agent, or Firm* — Jackson Walker L.L.P.

(57) ABSTRACT

In accordance with embodiments of the present disclosure, an information handling system may include a processor and an access controller communicatively coupled to the processor. The access controller may be configured to, when locally coupled to a second information handling system determine if the second information handling system is authorized to perform virtual crash cart operations on the information handling system and, responsive to determining that the second information handling system is authorized to perform virtual crash cart operations on the information handling system, permit the second information handling system to perform virtual crash cart operations on the information handling system whereby the second information handling system implements one or more virtual information handling resources such that each virtual information handling resource behaves at least in part as a physical information handling resource present at the information handling system.

19 Claims, 3 Drawing Sheets

(56) References Cited

U.S. PATENT DOCUMENTS

2013/0291064 A1* 10/2013 Ayvaz .................... G06F 21/00
           726/4
2015/0067402 A1*  3/2015 Lee ...................... G06F 11/079
           714/37

* cited by examiner

SYSTEMS AND METHODS FOR PROVIDING VIRTUAL CRASH CART ACCESS TO AN INFORMATION HANDLING SYSTEM

TECHNICAL FIELD

The present disclosure relates in general to information handling systems, and more particularly to methods and systems for providing access to service an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many traditional information handling systems (e.g., servers and enterprise equipment) offer front panel access to various user interface functions (e.g., input/output ports, video ports, interactive display panels, storage media drives, etc.) that allow a set of management features accessible to a user physically interacting with such front panel. These interfaces are often in accordance with well-defined industry standards with defined mechanical and electrical standards that leave little or no ability to improve the amount of physical space they consume.

Additionally, there is an industry trend towards server front ends that are substantially consumed by hard disk drives and/or non-impeded air paths for cooling. This competing desire leads to tradeoffs that may lead to loss of front-panel user interface functionality. In addition, traditional approaches to providing such front panel access often require the use of bulky crash carts comprising a wheeled cart, keyboard, mouse, and display monitor.

Another disadvantage to traditional approaches to front-panel access is that security settings for many access features require set up at the time of deployment and/or remote configuration of such settings. This often leads to cumbersome configuration and management of an information handling system.

Many other disadvantages to traditional approaches to front-panel access may also exist but are not discussed in detail here.

SUMMARY

In accordance with the teachings of the present disclosure, the disadvantages and problems associated with providing management access to an information handling system may be reduced or eliminated.

In accordance with embodiments of the present disclosure, an information handling system may include a processor and an access controller communicatively coupled to the processor. The access controller may be configured to, when locally coupled to a second information handling system determine if the second information handling system is authorized to perform virtual crash cart operations on the information handling system and, responsive to determining that the second information handling system is authorized to perform virtual crash cart operations on the information handling system, permit the second information handling system to perform virtual crash cart operations on the information handling system whereby the second information handling system implements one or more virtual information handling resources such that each virtual information handling resource behaves at least in part as a physical information handling resource present at the information handling system.

In accordance with these and other embodiments of the present disclosure, a method may include determining if a second information handling system is authorized to perform virtual crash cart operations on a first information handling system. The method may also include, responsive to determining that the second information handling system is authorized to perform virtual crash cart operations on the first information handling system, permitting the second information handling system to perform virtual crash cart operations on the first information handling system whereby the second information handling system implements one or more virtual information handling resources such that each virtual information handling resource behaves at least in part as a physical information handling resource present at the first information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
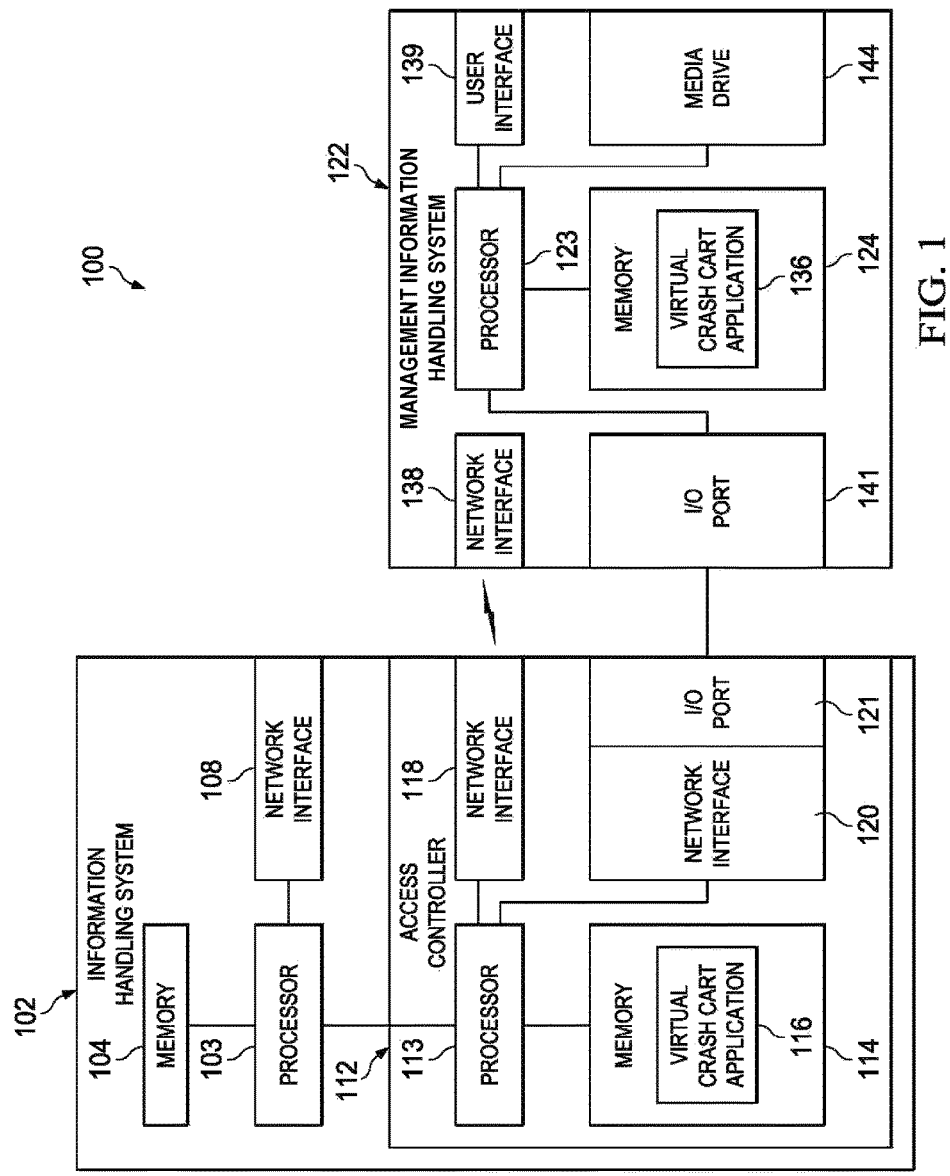
FIG. 1 illustrates a block diagram of an example system for providing virtual crash cart access to an information handling system, in accordance with embodiments of the present disclosure.
Figure 2:
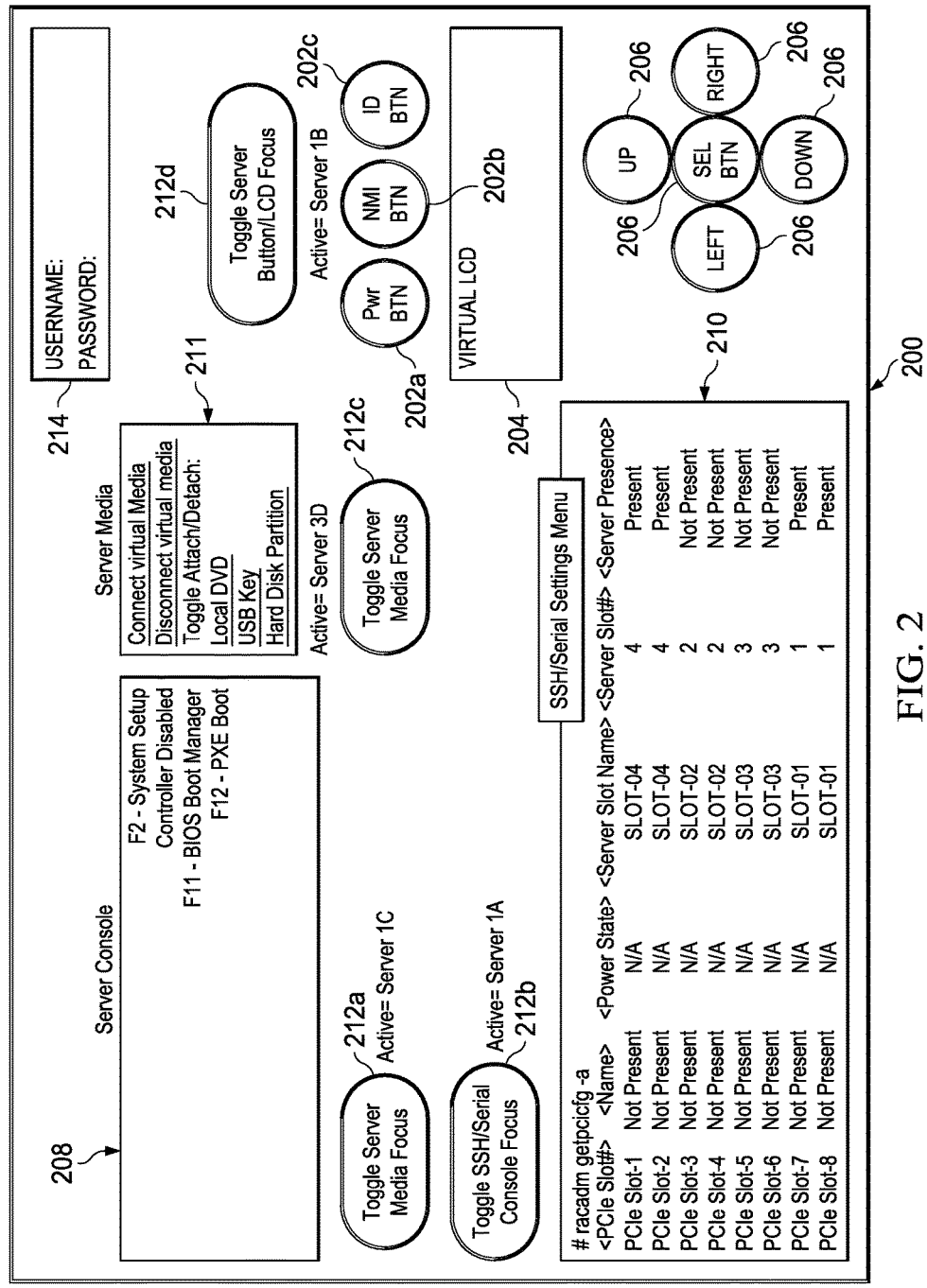
FIG. 2 illustrates an example graphical user interface screen that may be displayed by a virtual crash cart application via a user interface of an information handling system, in accordance with embodiments of the present disclosure.
Figure 3:
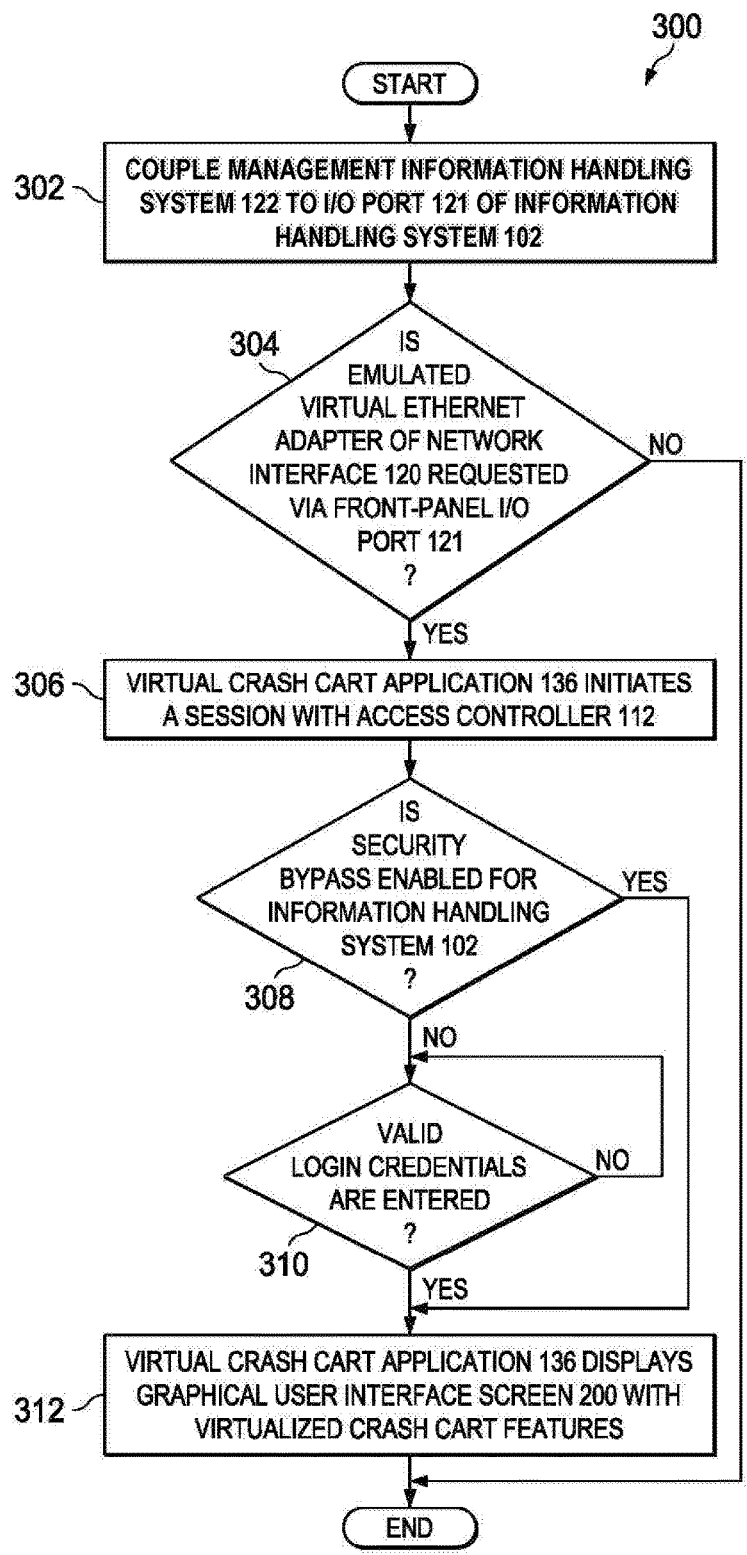
FIG. 3 illustrates a flow chart of an example method for providing virtual crash cart access to an information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, NFC, RFID, proximity card, vicinity card, ISO 14443, and ISO 15693.

FIG. 1 illustrates a block diagram of an example system 100 for providing virtual crash cart access to an information handling system 102, in accordance with embodiments of the present disclosure. As shown in FIG. 1, system 100 may include information handling system 102 and a management information handling system 122.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, and an access controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

Access controller 112 may be configured to provide out-of-band management facilities for management of information handling system 102. Such management may be made by access controller 112 even if information handling system 102 is powered off or powered to a standby state. Access controller 112 may include a processor 113, memory 114, an out-of-band network interface 118 separate from and physically isolated from in-band network interface 108, an out-of-band network interface 120 separate from and physically isolated from in-band network interface 108, and an I/O port 121. In certain embodiments, access controller 112 may include or may be an integral part of a baseboard management controller (BMC) or a remote access controller (e.g., a Dell Remote Access Controller of Integrated Dell Remote Access Controller). In other embodiments, access controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or access controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to access controller 112 is turned off.

As shown in FIG. 1, memory 114 may have stored therein virtual crash cart application 116. Virtual crash cart application 116 may include any system, device, or apparatus configured to, as described in greater detail elsewhere in this disclosure, facilitate and manage management access to another information handling system locally coupled to information handling system 102 (e.g., via a direct wired connection or via short-range wireless communication). In some embodiments, virtual crash cart application 116 may include or be part of a World Wide Web server application.

Each of network interfaces 118 and 120 may comprise any suitable system, apparatus, or device operable to serve as an interface between access controller 112 to one or more other information handling systems. Network interfaces 118 and 120 may enable access controller 112 to communicate using any suitable transmission protocol and/or standard. In these and other embodiments, network interface 118 may comprise a network interface card, or "NIC." In some embodiments, network interface 118 may be configured to couple to another information handling system (e.g., management information handling system 122) via short-range wireless communication technologies. Also, as shown in FIG. 1, network interface 120 may couple to another information handling system (e.g., management information handling system 122) via an I/O port 121 coupled to a corresponding port of such other information handling system via a wired connection. In some embodiments, network interface 120 may comprise a physical network interface card, or "NIC." In other embodiments, network interface 120 may be implemented as a virtual NIC (e.g., implemented by software configured to execute on processor 113 of access controller 112).

I/O port 121 may comprise any system, device, and apparatus configured to receive an external device and electrically couple such external device to access controller 112 via network interface 120. For example, in some embodiments, an I/O port 121 may comprise a Universal Serial Bus (USB) port having a connector configured to receive a corresponding connector of a USB device (e.g., a USB key drive or thumb drive). In these and other embodiments, an I/O port 121 may comprise any other type of suitable external port (e.g., Serial Advanced Technology Attachment (SATA), serial port, parallel port, etc.) to which any suitable device may be coupled.

In addition to processor 103, memory 104, network interface 108, and access controller 112, information handling system 102 may include one or more other information handling resources.

In some embodiments, management information handling system 122 may be a personal computer. In other embodiments, management information handling system 122 may comprise or be an integral part of a server. In yet other embodiments, management information handling system 122 may be a portable information handling system (e.g., a laptop, notebook, tablet, handheld, smart phone, personal digital assistant, etc.). As depicted in FIG. 1, management information handling system 122 may include a processor 123, a memory 124 communicatively coupled to processor 123, a network interface 138 communicatively coupled to processor 123, a user interface 139 communicatively coupled to processor 123, an I/O port 141 communicatively coupled to processor 123, and a media drive 144 communicatively coupled to processor 123.

Processor 123 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124, a computer-readable medium inserted into media drive 144, and/or another component of management information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management information handling system 122 is turned off.

As shown in FIG. 1, memory 124 may have stored therein virtual crash cart application 136. Virtual crash cart application 136 may include any system, device, or apparatus configured to, as described in greater detail elsewhere in this disclosure, access another information handling system 102 locally coupled to management information handling system 122 (e.g., via a direct wired connection or via short-range wireless communication) in order to perform management operations with respect to information handling system 102. In some embodiments, virtual crash cart application 136 may include or be part of a web browser or web client application.

Network interface 138 may comprise any suitable system, apparatus, or device operable to serve as an interface between management information handling system 122 and one or more information handling systems. Network interface 138 may enable management information handling system 122 to communicate using any suitable transmission protocol and/or standard. In these and other embodiments, network interface 138 may comprise a NIC.

User interface 139 may include any system, apparatus, or device via which a user may interact with information handling system 102 and its various components by facilitating input from a user allowing the user to manipulate information handling system 102 and output to a user allowing information handling system 102 to indicate effects of the user's manipulation. For example, user interface 139 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of an enclosure of management information handling system 122 and receive power from power supplies (not explicitly shown) of such enclosure. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 139 may include other user interface elements (e.g., a keypad, buttons, and/or switches placed in proximity to a display) allowing a user to provide input to management information handling system 122.

I/O port 141 may comprise any system, device, and apparatus configured to receive an external device and electrically couple such external device to management information handling system 122. For example, in some embodiments, an I/O port 141 may comprise a Universal Serial Bus (USB) port having a connector configured to receive a corresponding connector of a USB device (e.g., a USB key drive or thumb drive). In these and other embodiments, an I/O port 141 may comprise any other type of suitable external port (e.g., Serial Advanced Technology Attachment (SATA), serial port, parallel port, etc.) to which any suitable device may be coupled.

Media drive 144 may comprise any system, device, or apparatus configured to couple computer-readable media (e.g., a Digital Versatile Disc (DVD), compact disc (CD), flash memory, etc.), inserted into or otherwise engaged with media drive 144 to processor 123, so that processor 123 may read from or write to such computer-readable media.

In addition to processor 123, memory 124, network interface 138, user interface 139, I/O port 141, and media drive 144, management information handling system 122 may include one or more other information handling resources.

In operation, virtual crash cart application 136 may execute on processor 123 of management information handling system 122 and may communicatively couple with access controller 112 of information handling system 102 and implement one or more virtual information handling resources such that each virtual information handling resource behaves at least in part as a physical information handling resource present at information handling system 102, as illustrated in FIG. 2.

FIG. 2 illustrates an example graphical user interface screen 200 that may be displayed by virtual crash cart application 136 via a user interface 139 of an information handling system (e.g., management information handling system 122), in accordance with embodiments of the present disclosure. As depicted in FIG. 2, graphical user interface screen 200 may include various user interface features that correspond to virtual information handling resources. For example, graphical user interface screen 200 may include virtual console buttons 202 (e.g., 202a-202c) that each implement the function of a physical button that would otherwise be present at information handling system 102, such that when a user interacts with a virtual console button 202 (e.g., by pointing and clicking to such virtual console button 202, pushing such button 202 on a touch-screen display of user interface 139, etc.), virtual crash cart application 136 communicates a message to virtual crash car application 116 which causes processor 113 and/or processor 103 to implement functionality as if a corresponding physical button present on the front panel of information handling system 102 was depressed. Similarly, graphical user interface screen 200 may include virtual liquid-crystal display (LCD) 204 that displays alphanumerical and/or graphical data that would otherwise be present on a front panel of information handling system 102. In addition, graphical user interface screen 200 may include LCD input buttons 206 that mimic physical buttons that would otherwise be present at information handling system 102 for manipulating the display of the LCD screen virtualized by virtual LCD display 204.

In addition or alternatively, graphical user interface screen 200 may include elements associated with virtualized keyboard-video-mouse (KVM) functions. For example, graphical user interface screen 200 may include a virtual server console window 208 that displays video output associated with processor 103 (e.g., what information handling system 102 would output to a display device coupled thereto). As another example, graphical user interface screen 200 may include a virtual serial console window 210 that displays a secure shell (SSH) session associated with access controller 112.

In addition or alternatively, graphical user interface screen 200 may include a media status panel 211 for controlling access by information handling system 102 to computer-readable media (e.g., within media drive 144 and/or on a partition of a hard disk drive integral to information handling system 122) of management information handling system 122 that may function as virtual media locally residing with information handling system 102.

In addition or alternatively, for server systems which include multiple information handling systems 102 within a single chassis or enclosure, graphical user interface screen 200 may include one or more virtual toggle buttons 212 (e.g., 212a-212d) for virtualizing a physical button that would otherwise be present at information handling system 102 for toggling focus of elements of graphical user interface screen 200 among such multiple information handling systems 102. For example, virtual toggle button 212a may toggle KVM focus of virtual server console window 208 among multiple information handling systems 102, virtual toggle button 212b may toggle focus of virtual serial console window 210 among multiple information handling systems 102, virtual toggle button 212c may toggle focus of media status panel 211 among multiple information handling systems 102, and virtual toggle button 212c may toggle focus of virtual LCD screen 204 and its various associated virtual buttons 206 among multiple information handling systems 102.

In these and other embodiments, graphical user interface screen 200 may include a prompt 214 for entering login credentials into virtual crash cart application 136. For example, in some embodiments, permission for a user to interact with one or more elements of graphical user interface screen 200 may be authorized in response to entering authorized credentials (e.g., username and password). As another example, in these and other embodiments, a multitiered authentication scheme may be created with users having different access permissions. Thus, in some of such embodiments, a user may interact with some elements of the graphical user interface screen 200 without entering credentials (e.g., virtual buttons 202 and 206, virtual toggle buttons 212, media status panel 211, server console window 208), but may only interact with other elements of the graphical user interface screen 200 (e.g., serial console window 210) or other features of virtual crash cart applications 136 and 116 by entering suitable credentials.

Thus, access otherwise achieved through components of a server front panel in traditional implementations may, with the methods and systems disclosed herein, be achieved in a much smaller physical footprint and lesser cabling, while not foregoing any existing functionality. For example, all of such components that would otherwise be present on a front panel of an information handling system 102 may be replaced with a single I/O port or short-range wireless communication interface.

FIG. 3 illustrates a flow chart of an example method 300 for providing virtual crash cart access to information handling system 100, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, virtual crash cart access may be initialized by coupling an external device (e.g., management information handling system 122) to a suitable front-panel I/O port 121 of information handling system 102. In some embodiments, the I/O port may be coupled to a network interface 120 pre-configured with a known fixed Internet Protocol address, such that I/O port 121 together with network interface 120 emulates a virtual network adapter (e.g., an Ethernet adapter).

At step 304, access controller 112 (e.g., via firmware executing on processor 123) may determine whether the emulated virtual Ethernet adapter of network interface 120 is requested via front-panel I/O port 121. If the emulated virtual Ethernet adapter of network interface 120 is requested via front-panel I/O port 121, method 300 may proceed to step 306. Otherwise, method 300 may end.

At step 306, virtual crash cart application 136 may initiate a session with access controller 112 via virtual crash cart application 116. In some embodiments, virtual crash cart application 136 may include or be part of a web browser application, such that the session may be initiated by a user launching the web browser and entering an appropriate HyperText Transfer Protocol (HTTP) address for access controller 112, such that functionality of virtual crash cart application 116 is served to management information handling system 122.

At step 308, virtual crash cart application 136 and/or virtual crash cart application 116 may determine if a security bypass is enabled for information handling system 102. When information handling system 102 is deployed, an administrator may choose to enable or disable access to virtual crash cart features via I/O port 121 and/or apply selectable security features, including bypassing authentication for users accessing information handling system 102 via a device coupled to information handling system 102 via port 121. If security bypass is enabled, method 300 may proceed to step 312. Otherwise, method 300 may proceed to step 310.

At step 310, if security bypass is disabled, virtual crash cart application 136 may query a user for login credentials. If valid login credentials are entered, method 300 may proceed to step 312. Otherwise, step 310 may repeat until valid credentials are entered.

At step 312, virtual crash cart application 136 may display a graphical user interface screen 200 with virtualized crash cart features, as earlier described herein.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 300 or any other system operable to implement method 300. In certain embodiments, method 300 may be implemented partially or fully in software and/or firmware embodied in computer-readable media.

The discussion of FIG. 3 contemplates information handling system 102 coupling to management information handling system 122 via I/O port 121 via a wired connection. However, methods and systems similar and analogous to those herein described may be used to effectuate coupling of information handling system 102 to management information handling system 122 via short-range wireless communications.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:
1. An information handling system comprising:
a system processor;
an in-band network interface communicatively coupled to the system processor;
a system memory; and an access controller communicatively coupled to the system processor, the access controller including:
an access controller processor;
an access controller memory;
an access controller network interface comprising an out-of-band network interface having a fixed IP address and communicatively coupled to the access controller processor to provide an emulated virtual Ethernet adapter; and
a front panel access controller I/O port, wherein the front panel access controller I/O port comprises an I/O port accessible to a user via a front panel of the information handling system, wherein the front panel access controller I/O port is coupled to the emulated virtual Ethernet adapter;
wherein the access controller is configured to perform access controller operations comprising:
detecting a request for the emulated virtual Ethernet adapter, from an external system;
determining whether the request for the emulated virtual Ethernet adapter was received via the front panel access controller I/O port;
responsive to determining that the request for the emulated virtual Ethernet adapter was received via the front panel access controller I/O port, identifying the external system as an authorized external system and displaying, on a graphical user interface screen of the authorized external system, one or more virtual crash cart resources configured to function as an information handling resource of the information handling system; and
responsive to determining that the request for the emulated virtual Ethernet adapter was not received via the front panel access controller I/O port, terminating said access controller operations.

2. The information handling system of claim 1, wherein the one or more virtual crash cart resources include a virtual button of a user interface of the information handling system, wherein the virtual button is displayed to the graphical user interface screen of the external system.

3. The information handling system of claim 1, wherein the one or more virtual crash cart resources include a virtual storage medium for the information handling system, wherein the virtual storage medium is physically implemented by a computer-readable media coupled to the external system.

4. The information handling system of claim 1, wherein the one or more virtual crash cart resources include a virtual display of the information handling system, wherein display contents of the information handling system are displayed to a display screen of the external system.

5. The information handling system of claim 1, wherein the network interface is preconfigured with the particular fixed IP address.

6. The information handling system of claim 5, wherein the front panel access controller I/O port comprises a universal serial bus (USB) port.

7. The information handling system of claim 6, wherein the emulated virtual Ethernet adapter comprises an emulated virtual USB Ethernet adapter.

8. The information handling system of claim 1, wherein determining whether the external system is authorized includes validating login credentials provided by the user of via the external system.

9. The information handling system of claim 8, wherein the access controller is configured to execute a multiple-tier access policy wherein:
validating the login credentials provided by the user of the external system comprises a prerequisite to performing at least one, but less than all, virtual crash cart operations.

10. A method of performing access controller operations comprising:
detecting a request for an emulated virtual Ethernet adapter from an external system coupled to the information handling system, wherein the emulated virtual Ethernet adapter is provided by an access controller network interface comprising an out-of-band network interface having a particular IP address;
determining whether the request for the emulated virtual Ethernet adapter was received via a front panel access controller I/O port, wherein the front panel access controller I/O port comprises an I/O port coupled to the emulated virtual Ethernet adapter, wherein the emulated virtual Ethernet adapter comprises a network adapter of an access controller of the information handling system and wherein the front panel access controller I/O port is accessible to a user via a front panel of the information handling system, wherein the access controller is communicatively coupled to a system processor, which is communicatively coupled to an in-band network interface;
responsive to determining that the request for the emulated virtual Ethernet adapter was received via the front panel access controller I/O port, identifying the external system as an authorized external system and displaying, on a graphical user interface screen of the authorized external system, one or more virtual crash cart resources configured to function as an information handling resource of the information handling system; and
responsive to determining that the request for the emulated virtual Ethernet adapter was not received via the front panel access controller I/O port, terminating said access controller operations.

11. The method of claim 10, wherein the virtual crash cart resource includes a virtual button of a user interface of the information handling system, wherein the virtual button is displayed to the graphical user interface screen of the external system.

12. The method of claim 10, wherein the virtual crash cart resource includes a virtual storage medium for the information handling system, wherein the virtual storage medium is physically implemented by a computer-readable media coupled to the external system.

13. The method of claim 10, wherein the virtual crash cart resource comprises a virtual display of the information handling system, wherein display contents of the information handling system are displayed to a display screen of the external system.

14. The method of claim 10, wherein the network interface of the network adapter is preconfigured with a particular fixed IP address.

15. The method of claim 14, wherein the front panel access controller I/O port comprises a universal serial bus (USB) port.

16. The method of claim 10, wherein receiving the system request comprises receiving the request via a short-range wireless connection.

17. The method of claim 16, wherein the short-range wireless connection comprises a Bluetooth connection.

18. The method of claim 10, further comprising:
validating login credentials provided by the user of the external system.

19. The method of claim 18, further comprising:
executing a multiple-tier access policy wherein virtual crash cart operations supported by the external system include:
a first subset of the virtual crash cart operations, which the access controller may permit without validating the login credentials; and
a second subset of the virtual crash cart operations, which the access controller may permit only after validating the login credentials.

* * * * *